Patented Feb. 25, 1936

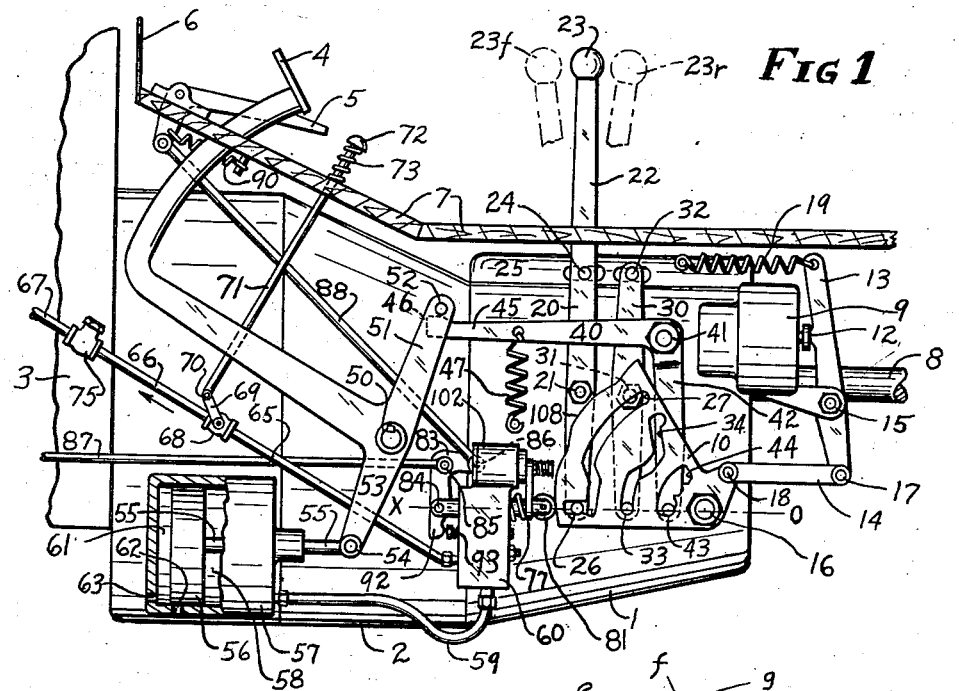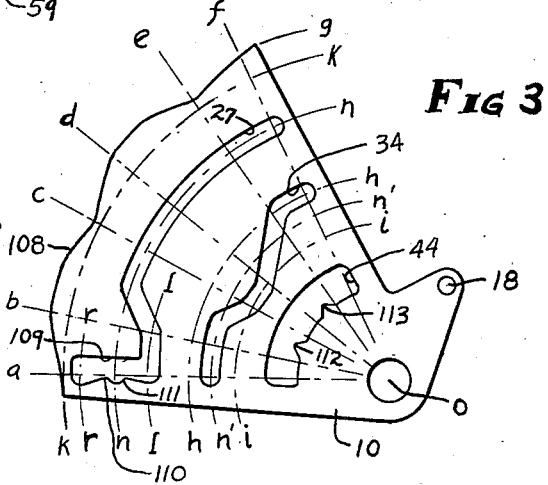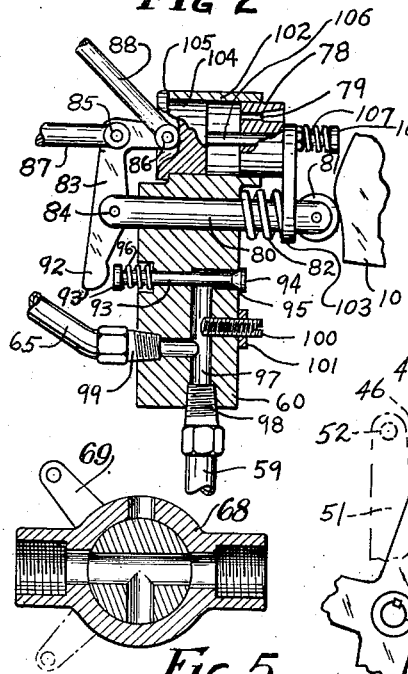

2,031,807

UNITED STATES PATENT OFFICE 2,031,807

POWER TRANSMITTING DEVICE FOR AUTOMOTIVE VEHICLES

Oscar Werner, Cleveland, Ohio

Application January 20, 1932, Serial No. 587,680

27 Claims. (Cl. 192—.01)

An object of the invention is to provide in automotive vehicles, such as automobiles, rail cars and the like, automatic means for shifting the gears in the transmission whenever the motor vehicle has attained a certain predetermined speed and means to enable the operator of the vehicle to delay this gear shifting operation, if he so desires, and to control the general direction of travel of the vehicle.

A further object is to provide an automatically operated clutch, which will be disengaged whenever the engine throttle is closed, but the reengagement of which will take place only after the speed of the engine has been synchronized with the speed of the driven shaft of the transmission.

A further object is to provide a "free wheeling" device of simple construction and means for making its use optional.

A further object is to provide a device of the aforementioned character which is simple in construction, positive in operation and readily applicable to the type of power transmitting means now commonly used in automotive vehicles.

The accompanying drawing and the following specifications are intended only as typical of the various forms which the invention may take. Other forms may suggest themselves from the specifications and claims to follow.

In the accompanying drawing:

Fig. 1 is a side elevation of a typical automotive engine, clutch and transmission equipped with my device and illustrating the general arrangement of the parts entering into the invention.

Fig. 2 is an enlarged side elevation in section of the clutch control box shown in Fig. 1.

Fig. 3 is an enlarged side elevation of the cam-plate shown in Fig. 1.

Fig. 4 is a fragmentary side elevation of levers 51 and 45 shown in Fig. 1.

Fig. 5 is a detail section.

Referring more particularly to Fig. 1:

1 denotes the transmission housing, 2 the clutch housing, 3 the engine proper, 4 the clutch throw-out lever, 5 the foot throttle, 6 the dash-board, 7 the floor boards and 8 the driving shaft, all of conventional design. 9 denotes the housing of a centrifugal governor, rotated by means of a gear meshing with one of the constant mesh gears in the rear of the transmission so that its speed bears a constant ratio to the speed of driving shaft 8 and therefore of the vehicle itself. This governor is so connected to cam-plate 10 by means of governor extension shaft 12, lever 13 and link 14 that, as the vehicle speed increases, cam-plate 10 has a tendency to rotate downwardly in anti-clockwise direction around point o as center. 15 and 16 are the stationary fulcrums of lever 13 and cam-plate 10 respectively. 17 and 18 are pins connecting link 14 with lever 13 and cam-plate 10. Governor spring 19 tends to oppose the motion of parts 12, 13, 14 and 10 and to rotate cam-plate 10 upwardly in clockwise direction when the speed of the vehicle and the governor speed depending thereon are reduced.

Lever 20 is fulcrumed on stationary pin 21 and has an upward extension 22 projecting above floor-board 7 and terminating in hand knob 23. It is connected by means of pin 24 to a shifter bar (not shown) located within transmission cover 25 and adapted to engage the low speed and reverse speed gears in the transmission in the usual manner. At its lower end is mounted outwardly projecting pin 26 riding in the irregularly shaped slot 27 (see also Fig. 3) of cam-plate 10. Similarly lever 30 is fulcrumed on stationary pin 31 and engages by means of pin 32 a second shifter bar (not shown) also located within said transmission cover and adapted to engage the intermediate and high speed gears in the usual manner. At the lower end of lever 30 is mounted outwardly projecting pin 33 riding in irregularly shaped slot 34 of cam-plate 10. Bell crank 40 is fulcrumed on stationary pin 41 and has a downwardly extending arm 42 and, mounted at the lower end thereof, outwardly projecting pin 43 adapted to ride in irregularly shaped slot 44 of cam-plate 10. Its forwardly extending arm 45 terminates in latch 46 adapted to engage pin 52 of clutch lever 4 as will be shown later. Tension spring 47 tends to rotate bell crank 40 in anti-clockwise direction and to hold pin 43 in contact with the rearward contour of slot 44. Pins 26, 33 and 43 are so located that their mean-path of lateral travel coincides with line o—x.

Clutch throw-out lever 4 is rigidly mounted on clutch throw-out shaft 50 of conventional type, which latter projects outwardly from clutch housing 2. Its upward arm 51 has inwardly projecting pin 52 adapted to engage latch 46 of arm 45 above mentioned. Its downward arm 53 is connected by means of pin 54 to rod 55 of piston 56 slidably mounted in cylinder 57. The piston thus divides the cylinder into two chambers, a rear chamber 58 which is connected by pipe 59 to a control box 60 more fully described later on and a front chamber 61 which communicates with the atmosphere through holes 62 and 63.

Hole 62 is comparatively large, and is so located in the cylinder wall, that it is over-run and covered by the piston toward the end of its forward travel. Hole 63 located in the head of cylinder 57 is comparatively small and is open to atmosphere at all times. Control box 60 is connected by means of pipes 65, 66 and 67 to the engine manifold above the throttle. Interposed between pipes 65 and 66 is a three-way cock 68 of conventional design as illustrated in Fig. 5, the valve lever 69 of which is connected by pin 70 and rod 71 to knob 72 projecting above the floor board, and is normally held in the position shown by the action of spring 73. In this position valve 68 forms a communicating passage between pipes 65 and 66, but when knob 72 is depressed, this passage is closed and the atmosphere is admitted to pipe 65. Interposed between pipes 66 and 67 is check valve 75 of conventional type, designed to allow flow of air through pipe 66 in the direction of the arrow only.

Referring more particularly to Fig. 2:

Control box 60 is rigidly mounted on transmission housing 1. Slidably mounted therein is rod 80, the rearward end of which has roller 81 adapted to be held against contour 108 of cam-plate 10 by means of compression spring 82. At the forward end of rod 80 a bell crank 83 is rotatably mounted by means of pin 84. Said bell crank has a lower extension 92 adapted to engage collar 93' of valve stem 93 of valve 94 and to raise valve 94 off its seat 95, thereby admitting the atmosphere to passage 97. Normally valve 94 is held tightly against its seat by valve spring 96. The upper end of bell crank 83 is connected by pins 85 and 86 to rods 87 and 88 respectively, rod 87 leading to the carburetor throttle (not shown) and rod 88 being connected to foot throttle 5 of conventional design. Foot throttle 5 is held by tension spring 90 in the position shown in Fig. 1 when the vehicle is at rest. Passage 97 communicates with pipes 59 and 65 through pipe couplings 98 and 99 respectively. Screw 100 located in passage 97 is adapted to restrict said passage, thus throttling the flow of air entering past valve-seat 95. It is locked in place by locknut 101.

Also mounted on rod 80 is upwardly projecting arm 103, to the upper end of which is mounted piston 78, adapted to slide in cylinder 102. A small vent-hole 79 is provided in piston 78 to admit the atmosphere to the inner face of the piston. The other end of cylinder 102 is closed by piston 104 slidably mounted therein, and provided with shoulder 105 adapted to come in contact with the face of cylinder 102, thereby limiting the inward travel of the piston. Piston 104 is normally held in its innermost position by piston rod 106, projecting through piston 78, and by light spring 107 slidably mounted on said piston rod and pressing against collar 107'. Piston 104 is cupped out at its front end to receive the rearward portions of rod 88 and bell crank 83 and to maintain a small clearance between them, when both are in their most rearward positions (the engine throttle then being closed).

When the car is at rest, the parts described are in the position shown. But when cam-plate 10 is being oscillated, the cam shaped projections of contour 108 contacting with roller 81, will cause rod 80 to be displaced to the left thereby oscillating bellcrank 83, the upper end of which is held stationary by rod 88 and is thus prevented from following the travel of rod 80. Arm 92 will then move away from collar 93' of valve stem 93 and the gap between them will be increased.

At the same time piston 78, being connected to rod 80 by arm 103, will approach piston 104 and compress the air trapped, within cylinder 102 between pistons 78 and 104. If the inward travel of piston 78 is slow, a sufficient amount of compressed air will escape through hole 79 to reduce its pressure below that exerted by spring 107 and piston 104 will remain in the position shown. But if the inward travel of piston 78 is rapid, then a substantial air pressure will be built up between pistons 78 and 104, sufficient to overcome the pressure of spring 107. Piston 104 will then also move to the left and will displace the upper part of bell crank 83 and rods 88 and 87, thereby opening the engine throttle. Upon the slowing down or coming to a standstill of piston 78 the pressure between pistons 78 and 104 will again be reduced to atmospheric, by reason of the escape of air through vent 79. Piston 104 will then again return to the position shown and the engine throttle will close. Sufficient gap is provided between pistons 78 and 104 to avoid their contacting at any time.

Similarly upon displacement of rod 80 in the opposite direction the gap between 92 and 93 will be reduced. Piston 104 will then remain in the position shown, spring 107 and the vacuum created between piston 78 and 104 tending to pull piston 104 into cylinder 102. Spring 82 is made sufficiently strong to overcome the counteracting forces of such vacuum and of spring 107 and to maintain contact between roller 81 and contour 108 at all times.

Referring more particularly to Fig. 3:

Lines $o$—$a$, $o$—$b$, $o$—$c$, $o$—$d$, $o$—$e$, and $o$—$f$, represent different stations of the oscillation of cam-plate 10, the total range of its oscillation being represented by angle $a$—$o$—$f$. Angle $a$—$o$—$b$ represents the maximum range of oscillation of cam-plate 10 while the vehicle is in low gear, angle $c$—$o$—$d$ a similar range while the vehicle is in intermediate gear and angle $e$—$o$—$f$ a similar range while the vehicle is in high gear. Angles $b$—$o$—$c$ and $d$—$o$—$e$ represent the angular travel of cam-plate 10 while changing from low gear to intermediate gear and from intermediate gear to high gear respectively.

The irregularly shaped contour 108 of cam-plate 10 is adapted to contact roller 81 of rod 80 and to control the gap between arm 92 of bellcrank 83 and collar 93' of valve stem 93 as above described. This contour is so designed that upon downward rotation of cam-plate 10 this gap increases uniformly during angular travels $a$—$o$—$b$, $c$—$o$—$d$ and $e$—$o$—$f$, when the low, intermediate and high gears respectively are engaged, and decreases during angles $b$—$o$—$c$, and $d$—$o$—$e$, when the changes from low to intermediate gear and from intermediate to high gear respectively take place, the decrease occurring during the second halves of these angular travels. Arc $k$—$k$ around point $o$ as center denotes the baseline of contour 108.

Cam-plate 10 also has irregularly shaped slots 27, 34 and 44 adapted to engage pins 26, 33 and 43 of levers 20 and 30 and bell crank 40 respectively as described above, their path of lateral displacement being substantially along line $o$—$x$ in Fig. 1, which is also the path of displacement of roller 81.

Slot 27 has at its lower end a radial extension 109 so shaped, that when the vehicle is at rest and line $o$—$a$ coincides with line $o$—$x$ in Fig. 1, pin 26, riding in the slot, can be displaced laterally between arcs *r—r* and *l—l*, by the manipulation of hand knob 23, thereby engaging thru lever 20 and pin 24 and the shifter-bar attached thereto the reverse gears and the low speed gears of the transmission respectively. When pin 26 is on arc *n—n* neither gears are engaged. In the course of its lateral displacement pin 26 must pass over cam shaped projections 110 and 111 thereby causing cam-plate 10 to be forced downwardly a small amount against the pressure of spring 19. The lateral displacement of pin 26 will thus be opposed sufficiently to maintain it in the center or end position, chosen by the operator, and to enable the operator to find these positions by "feel". It is evident that when pin 26 is in the center or in the extreme left end of slot 109, it permits only a very slight downward rotation of cam-plate 10 before coming in contact with the upper contour of slot 109. However, when pin 26 is at the extreme right end of slot 109, cam-plate 10 is free to rotate downwardly. Upon downward rotation of the cam-plate the lateral displacement of pin 26 will no longer be at the option of the operator, but will be controlled solely by the shape of slot 27 in the following manner: While the cam-plate is rotating thru angle *a—o—b*, the location of pin 26 will coincide with arc *l—l* at which position the low-speed gears will remain engaged. Upon further downward rotation of cam-plate 10 through approximately one-half of angle *b—o—c* pin 26 will be displaced laterally until its position coincides with arc *n—n*, in which position the gears controlled by it will be disengaged as above stated. For the balance of the downward rotation of cam-plate 10, pin 26 will remain in this position.

Similarly slot 34 controls the lateral position of pin 33 in Fig. 1, which in turn controls the engagement of the intermediate and high speed gears of the transmission through lever 30, pin 32 and the shifter-bar connected thereto. While the cam-plate is at rest or is rotating through angle *a—o—b*, and one half of angle *b—o—c*, the position of pin 33 coincides with arc *n'—n'* and the gears are disengaged. Upon further downward rotation of the cam-plate through the second half of angle *b—o—c* pin 33 is displaced laterally until its position coincides with arc *i—i* when the intermediate speed gears are engaged. Rotation of the cam-plate through angle *c—o—d* will not alter this position of pin 33 and the intermediate speed gears will remain engaged. However, upon still further downward rotation of the cam-plate through angle *d—o—e*, pin 33 will again be displaced laterally, but in the opposite direction, until its final position coincides with arc *h—h*, when the high speed gears will be engaged. During the balance of the downward rotation of the cam-plate, pin 33 will remain in this latter position.

Slot 44 is adapted to receive pin 43 of bell crank 40 in Fig. 1, the pin normally being held against the rearward contour of the slot by action of spring 47. The rearward contour of slot 44 is provided with symmetrical cams 112 and 113 adapted to engage pin 43 while the cam-plate rotates through angles *b—o—c* and *d—o—e* respectively, raising pin 43 against the action of spring 47 during the first half of these angular travels of the cam-plate and allowing it to be returned by the action of spring 47 to its original position during the second half of these angular travels.

Thus during the early part of the cam engagement, bell crank 40 tends to impede the angular motion of cam-plate 10 and to delay it until the governor controlling the cam-plate travel has accumulated sufficient excess force to overcome the action of spring 47, while, during the later part of the cam engagement, bell crank 40 tends to accelerate the angular motion of cam-plate 10. As has already been shown, the travel of the cam-plate 10 through angles *b—o—c* and *d—o—e* results in the change from low to intermediate and from intermediate to high gear respectively and snappy and complete gear change is thus assured.

Bell crank 40 has the further function of preventing the rotation of cam-plate 10 through angles *b—o—c* and *d—o—e* respectively, and preventing the gear-changes resulting therefrom, while the clutch is engaged. Pin 52 of clutch throw-out lever 4 is then above latch 46 of arm 45 of bell crank 40 and prevents its upward rotation. (See Fig. 1 and solid lines in Fig. 4). As a result pin 43 can not move laterally and its contact with cams 112 and 113 will prevent any further downward rotation of the cam-plate, regardless of any increase in the speed of the vehicle.

Furthermore, when the clutch is disengaged preparatory to a gear-change, bell crank 40 will prevent its re-engagement until such gear change is completed, latch 46 then being raised into the path of travel of pin 52 and preventing its return to normal position. (See broken lines in Fig. 4).

Cams 112 and 113 being symmetrical, it is evident that the above described functions are independent of the direction of cam-plate rotation.

The operation of the mechanism covered by my invention is now as follows:

When the vehicle is at rest, with the engine not running, the various parts of the mechanism occupy the positions shown in Fig. 1. The operator then starts the engine in the conventional manner and after the usual warming up period, throttles it to idling speed. The vacuum created thereby in the engine manifold will then be communicated through 67, 75, 66, 68, 65, 60 and 59 to chamber 58 back of piston 56. The forward face of piston 56 however is exposed to atmospheric pressure, chamber 61 communicating with the atmosphere through large hole 62 and small hole 63 as shown. The pressure differential thus created will cause piston 56 to move rearwardly, thereby rotating arm 53 and disengaging the clutch.

The operator will then engage the reverse or the low speed gears in the usual manner, by moving lever 23 to positions 23*r* or 23*f* respectively, the position of cam-plate 10 then permitting the lateral displacement of pin 26.

If he wishes to reverse he will move lever 23 to position 23*r*, thereby engaging the reverse gears in the transmission. He will then open the throttle by depressing foot throttle 5, thereby rotating bell crank 83 in anti-clockwise direction, displacing rod 87 forwardly and opening the engine throttle connected thereto. The rotation of bell crank 83 will first close the gap between arm 92 and collar 93' and will then lift valve 94 away from its seat 95. Camplate 10 then being in the position shown in Fig. 1 the gap between 92 and 93' is very small and valve 94 will be raised almost immediately, thus allowing the clutch to engage at low engine speed. Air under atmospheric pressure will now rush past valve seat 95 and through passage 97 and pipe 59 to the rearward chamber 58 of cylinder 57, thus equalizing the pressure on both sides of piston 56 and allowing it to move forwardly under the action of the clutch spring (not shown). The air displaced by the forward travel of the piston will be forced out through holes 62 and 63. The forward travel of the piston will be practically unobstructed and will be very rapid until the piston overruns large hole 62 toward the end of its forward stroke. Thereafter, small hole 63 only will be open and the air-flow resistance caused thereby will retard the piston, thus slowing down the final phase of the clutch engagement. The speed of the forward travel of piston 56 can further be regulated by the throttling action of screw 100. A rapid and yet smooth clutch engagement is thus assured. The clutch now being engaged, the vehicle will move in rearward direction. Any further opening of the throttle will merely result in an increase of the speed of the vehicle. It will be noted that, while the reverse gears are engaged, cam-plate 10 is prevented from rotating downwardly by reason of pin 26 coming in contact with the upper contour of slot 109 as shown above. In the meantime pin 33 is held in neutral position $n'-n'$ by slot 34 (as shown) thus preventing the accidental engagement of the intermediate and high-speed gears.

If the operator now desires the vehicle to come to a standstill, he relieves the pressure on foot-throttle 5, (thereby automatically dis-engaging the clutch) and manually returns lever 23 to the center position. Pin 26 then comes to rest between cam shaped projections 110 and 111, which, as shown above, are provided to give the operator the desired "feel" of the gearshift and to maintain gearshift lever 23 in the chosen position.

If the operator now desires the vehicle to move in forward direction, he shifts hand lever 23 to position 23f. The vehicle is now in low gear with pin 26 at the rearward end of slot 109. He then opens throttle 5, thereby engaging the clutch. The vehicle now moves forwardly and, as it gains speed, cam-plate 10 will rotate downwardly until cam shaped projection 112 comes to rest against pin 43 which is prevented from moving laterally while the clutch is engaged, as shown above. During this angular travel of cam plate 10 pins 26 and 33 will not be displaced laterally, but will be held by slots 27 and 34 in paths $l-l$ and $n'-n'$ respectively, thus maintaining the engagement of the low speed gears and preventing any other conflicting gear engagements.

This angular travel of cam-plate 10 will also affect the position of rod 80 of control box 60, the then rising slope of contour 108 displacing rod 80 to the left, thereby increasing the gap between arm 92 of bell crank 83 and valve collar 93' as explained above. This will not affect the clutch disengagement, which is dependent only on the vacuum in the engine inlet manifold. To re-engage the clutch however, a correspondingly greater depression of foot throttle 5 will be required in order to close the gap between 92 and 93' and to open valve 94 controlling the clutch re-engagement. This depression of the foot throttle will displace rod 87, thereby partially opening the engine throttle and accelerating the engine at the time of clutch re-engagement.

It is evident that with proper design of the slope of contour 108 the engine speed at the time of clutch re-engagement will substantially coincide with the speed of the driven end of the transmission.

The lateral displacement of rod 80 will also result in the displacement of piston 78 and the compression of the air trapped between it and piston 104. The travel of piston 78 however will be sufficiently slow to allow the compressed air to escape through hole 79 as described, and no motion of piston 104 will result.

If the operator now wishes to go into intermediate gear he momentarily relieves the pressure on the foot throttle, thereby disengaging the clutch. The displacement of pin 52 coincident thereto will then unlock latch 46 and, provided cam-plate 10 has then, through the action of the governor, accumulated sufficient rotative energy, cam 112 will pass below pin 43, displacing it laterally against the action of spring 47, and cam-plate 10 will move through angle $b-o-c$. The first half of this motion will result in the lateral displacement of pin 26 until its position coincides with arc $n-n$ (both the low and the reverse gears then being disengaged) and the second half of the motion will result in the lateral displacement of pin 33 until its position coincides with arc $i-i$ (when the intermediate speed gears are engaged). This second half of angular travel $b-o-c$ will be accelerated by the pressure of pin 43 against the then falling contour of cam 112, as already described. A quick and complete gear change is thus assured.

As the cam-plate travels through angle $b-o-c$, the then falling slope of contour 108 will also decrease the gap between 92 and 93', thereby lowering the engine speed at the time of clutch re-engagement in proportion to the reduction in the speed of the driven shaft of the transmission, resulting from the shifting from low to intermediate gears.

The vehicle is now in intermediate gear and will remain so, while the cam-plate travels through angle $c-o-d$, the lateral position of pins 26 and 33 remaining unchanged. However, the then rising slope of contour 108 will again increase the gap between 92 and 93', causing an increase in the engine speed at the time of clutch re-engagement in proportion to the increase in speed of the driven shaft of the transmission.

Upon further increase of vehicle speed, cam 113 will come in contact with pin 43 and, provided the cam-plate has then stored up sufficient rotative energy, it will, when latch 46 is unlocked by the dis-engagement of the clutch, rotate through angle $d-o-e$. This motion will cause pin 43 to be displaced laterally until its position coincides with arc $h-h$, thereby first dis-engaging the intermediate speed gears and then engaging the high-speed gears. The position of pin 26 however will remain unaltered. The then falling slope of contour 108 will also again reduce the engine speed at the time of clutch re-engagement in proportion to the reduction in the speed of the driven shaft of the transmission, resulting from the shifting from intermediate to high gear.

The vehicle is now in high gear and will remain so during the balance of the downward rotation of cam-plate 10, pins 26 and 33 being held stationary by slots 27 and 34 respectively. However, as the cam-plate rotates through angle $e-o-f$, the then rising slope of contour 108 will again increase the engine speed at the time of the clutch re-engagement in accordance with the increase in vehicle speed.

The above describes the cycle of events occurring while the vehicle is gaining speed. If now the vehicle is slowing down, cam-plate 10 under action of the governor will rotate in opposite (clockwise) direction and the cycle of operations will be reversed. As the vehicle loses speed the engine speed at the time of clutch re-engagement will be decreased and, as gear shifts occur, the engine speed at the time of clutch re-engagement will be increased in proportion to the increase in the speed of the driven shaft of the transmission, resulting from said gear changes.

During these gear changes, piston 78 will be displaced to the left and, due to the rapidity of the gear changes and the sudden rise in the slope of contour 108 within angles e—o—d and c—o—b respectively, the travel of piston 78 will be rapid. The rate of compression of the air trapped between pistons 78 and 104 will then exceed the rate of discharge through hole 79 and piston 104 will be forced to the left, overcoming the pressure of spring 107, displacing rod 87 and opening the engine throttle. The engine will then be speeded up, thereby speeding up the driven shaft of the transmission, while shifting from a higher to a lower gear. It is well known that this greatly facilitates the shifting operation. This speeding up will be only momentary, the compressed air rapidly escaping through hole 79 as piston 78 reaches the end of its stroke, thus allowing piston 104 to return to its normal position under action of spring 107.

It is evident from the foregoing, that by keeping the engine throttle opened sufficiently to avoid a high vacuum in the engine manifold, the operator can delay to any desired extent, the disengagement of the clutch preparatory to the automatic shifting of the gears, and therefore the shifting operation itself. He cannot, however, cause the shifting of the gears to occur until the minimum shifting speeds, for which the mechanism is adjusted, have been reached. Undue strain on engine and gears is thus prevented.

It will also be evident from the foregoing, that the clutch is automatically disengaged by the vacuum in the engine inlet manifold, whenever the pressure on foot throttle 5 is fully relieved. The vehicle is therefore "free wheeling" in all speeds.

Should the operator, in order to use the engine as a brake, or for any other reason, desire to keep the clutch engaged while the throttle is closed, he merely depresses knob 72, thereby turning valve lever 69 and admitting air under atmospheric pressure to clutch cylinder 57. The clutch will now remain engaged regardless of the position of foot throttle 5.

It will be apparent to those skilled in the art, that a large number of variations and different combinations may be made in the mechanical structure and the design of the mechanisms entering into this invention, without altering the fundamental principles of operation and structure herein explained.

What I claim is:

1. In an automotive vehicle having an internal combustion engine, a clutch and a gear-changing transmission, automatic means for shifting the transmission gears when the proper vehicle speed has been reached and automatic means for disengaging the clutch whenever the engine throttle is closed and for re-engaging same when the engine throttle is opened sufficiently to synchronize the speed of the engine with the speed of the driven shaft of the transmission, and interlocking means for preventing the shifting of the gears while the clutch is engaged and for preventing the reengagement of the clutch previous to the completion of the gear shift operation.

2. In an automotive vehicle having an internal combustion engine, a clutch and a gear-changing transmission, automatic means for shifting the transmission gears when the proper vehicle speed has been reached and automatic means for disengaging the clutch whenever the engine throttle is closed and for re-engaging same when the engine throttle is opened sufficiently to synchronize the speed of the engine with the speed of the driven shaft of the transmission, the means for shifting the gears and for re-engaging the clutch being controlled by an actuating device, the position of which varies with the speed of the vehicle.

3. In an automotive vehicle having an internal combustion engine, a clutch and a gear-changing transmission, automatic means for shifting the transmission gears when the proper vehicle speed has been reached and automatic means for disengaging the clutch whenever the engine throttle is closed and for re-engaging same when the engine throttle is opened sufficiently to synchronize the speed of the engine with the speed of the driven shaft of the transmission, the means for shifting the gears and for re-engaging the clutch being controlled by an oscillating cam-plate, the angular position of which varies with the speed of the driving shaft of the transmission.

4. In an automative vehicle having an internal combustion engine, a clutch and gear-changing transmission, automatic means for shifting the transmission gears when the proper vehicle speed has been reached and automatic means for disengaging the clutch whenever the engine throttle is closed and for re-engaging same when the engine throttle is opened sufficiently to synchronize the speed of the engine with the speed of the driven shaft of the transmission, the means for shifting the gears and for re-engaging the clutch being controlled by an oscillating cam-plate, the angular position of which varies with the speed of the driving shaft of the transmission, and interlocking means for preventing the shifting of gears while the clutch is engaged and for preventing the re-engagement of the clutch previous to completion of the gear shifting operation.

5. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission, and comprising rocking levers, the lower ends of which engage in slots in the cam-plate and the upper ends of which are adapted to shift the transmission gears, the rocking lever shifting the low and reverse gears having an upward extension adapted for manual operation.

6. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission, interlocking means for preventing the shifting of gears while the clutch is engaged and for preventing the re-engagement of the clutch previous to completion of the gear shifting operation, said means comprising a bell crank, one arm of which engages cam shaped projections on the cam-plate, while the gears are being shifted, and the other arm of which terminates in a latch, adapted to engage a pin mounted on the clutch throw-out shaft-lever, so that, while the clutch is engaged said pin is above the latch, thereby preventing the rotation of the bell crank required to allow the cam shaped projections of the cam-plate to pass its arm and thus preventing further rotation of the cam-plate and that, when the clutch is disengaged and if the bell crank has been displaced by the cam shaped projections of the cam-plate, the forward face of the latch crosses the path of travel of said pin of the clutch throw-out shaft lever, thereby preventing the re-engagement of the clutch, and a spring opposing the displacement of said bell crank, thereby retarding the start of the gear shifting operation, until the cam-plate has accumulated sufficient rotative energy to overcome the action of said spring and accelerating the second half of the gear shifting operation by the pressure exerted by the bell crank on the then falling slope of the cam shaped projections of the cam-plate.

7. In an automotive vehicle having an internal combustion engine, a clutch and a gear-changing transmission, vacuum operated means for disengaging the clutch when the engine throttle is closed to idling position, means for relieving the vacuum and re-engaging the clutch when the throttle is opened and automatic means for so controlling the degree of throttle opening required to re-engage the clutch, that the speed of the engine at the time of clutch re-engagement substantially coincides with the speed of the driven shaft of the transmission at all vehicle speeds.

8. In an automotive vehicle having an internal combustion engine, a clutch and a gear-changing transmission, automatic means for disengaging the clutch whenever the engine throttle is closed and for re-engaging same when the engine throttle is opened sufficiently to synchronize the speed of the engine with the speed of the driven shaft of the transmission, said means comprising a cylinder, one end of which communicates with the engine inlet manifold above the throttle, a member movably mounted therein and adapted to be subjected on one side to atmospheric pressure and on the other side to the vacuum in the engine-inlet-manifold and to be displaced by it when this vacuum has been increased to a predetermined degree by the closing of the throttle, linkage connecting said member to the clutch throw-out-lever and disengaging the clutch when the member is so displaced, a non-return valve adapted to maintain the vacuum in said cylinder by permitting the free flow of air from it to said engine inlet manifold but preventing the flow of air in opposite direction, a valve the opening of which admits air under atmospheric pressure to said cylinder, thereby relieving the vacuum in it, a lever connected to the throttle and adapted to open said valve, a variable gap between said lever and said valve for the purpose of varying the degree of throttle opening prior to the opening of said valve, and automatic means for so controlling the magnitude of this gap, that the engine speed corresponding to the opening of the throttle at the time of opening of the valve substantially coincides with the speed of the driven shaft of the transmission, at all vehicle speeds.

9. In an automotive vehicle having an internal combustion engine, a clutch and a gear-changing transmission, automatic means for disengaging the clutch whenever the engine throttle is closed and for re-engaging same when the engine throttle is opened sufficiently to synchronize the speed of the engine with the speed of the driven shaft of the transmission, said means comprising a cylinder, one end of which communicates with the engine inlet manifold above the throttle, a member movably mounted therein and adapted to be subjected on one side to atmospheric pressure and on the other side to the vacuum in the engine-inlet-manifold and to be displaced by it when this vacuum has been increased to a predetermined degree by the closing of the throttle, linkage connecting said member to the clutch throw-out-lever and disengaging the clutch when the member is so displaced, a non-return valve adapted to maintain the vacuum in said cylinder by permitting the free flow of air from it to said engine inlet manifold but preventing the flow of air in opposite direction, a valve the opening of which admits air under atmospheric pressure to said cylinder, thereby relieving the vacuum in it, a lever connected to the throttle and adapted to open said valve, a variable gap between said lever and said valve for the purpose of varying the degree of throttle opening prior to the opening of said valve, and automatic means for so controlling the magnitude of this gap, that the engine speed corresponding to the opening of the throttle at the time of opening of the valve substantially coincides with the speed of the driven shaft of the transmission, at all vehicle speeds, said automatic means comprising an oscillating cam-plate, the angular position of which varies with the speed of the driving shaft of the transmission, the contour of the cam-plate being adapted to displace laterally the fulcrum of the lever opening said valve, and to thereby vary the gap between said lever and said valve, and being so shaped that, while any set of gears is engaged, this gap is increased during acceleration of the vehicle and decreased during its deceleration and that, when gear shifts occur, this gap is being decreased while shifting from a lower to a higher gear and being increased while shifting from a higher to a lower gear in accordance with the coincident change in the speed-ratios between the driven and the driving shaft of the transmission.

10. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission and automatic means for momentarily speeding up the engine while shifting from higher to lower gears.

11. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission and automatic means for momentarily speeding up the engine while shifting from higher to lower gears, the latter comprising a cylinder, a piston movably mounted therein and adapted to be moved inwardly by the cam-plate while the above gearchanges occur, a second piston normally held in rearward position by a spring, but adapted to contact the throttle-opening-mechanism and to open the throttle under the action of the air compressed by said first piston on its inward stroke, and a vent-hole so proportioned that whenever the first piston travels slowly or comes to a standstill, the pressure of the air will be relieved.

12. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission, manual means for engaging the low gears and the reverse gears and means for preventing the rotation of the cam-plate and the engagement of conflicting gears while said reverse gears are engaged.

13. In an automotive vehicle having an internal combustion engine, a clutch and a gear-changing transmission, automatic means for shifting the transmission gears, said means being actuated by an oscillating cam-plate, the angular position of which varies with the speed of the driving shaft of the transmission, and means for preventing the accidental engagement of the reverse gears while any of the forward gears are engaged and the vehicle is moving in excess of a predetermined minimum speed.

14. In an automotive vehicle, having an internal combustion engine, a clutch and a gear-changing transmission, automatic means for operating the clutch and automatic means for shifting the transmission gear when the proper vehicle speed has been reached, and when the engine throttle is retarded, the gear-shifting means and the clutch operating means being controlled by a cam, the position of which varies with the speed of the driven shaft of the transmission.

15. In an automotive vehicle, having an internal combustion engine, a clutch and a gear changing transmission, automatic means for momentarily speeding up the engine while shifting from higher to lower gears, said means comprising a cam adapted to advance or retard the engine throttle, the movement of said cam being synchronized with the gear-shifting operation.

16. In an automotive vehicle, having an internal combustion engine, a clutch and a gear changing transmission, automatic means for shifting the transmission gears by power from a shaft of the transmission, and means for increasing the power consequent upon movement of the shifting means.

17. In an automotive vehicle, having an internal combustion engine, a clutch and a gear changing transmission, automatic means for shifting the transmission gears, power means for operating the shifting means, said power means being actuated from a shaft of the transmission, and automatic means for supplying power to the shifting means from a second power source when the movement of the shifting means is resisted.

18. In an automotive vehicle having an internal combustion engine, a clutch and a gear-changing transmission, vacuum operated means for disengaging the clutch when the engine throttle is substantially retarded, means for relieving the vacuum and re-engaging the clutch when the throttle is opened, automatic means for controlling the degree of throttle opening required to re-engage the clutch, and means for synchronizing the speed of the driving shaft with the speed of the driven shaft of the transmission.

19. In an automotive vehicle, having an internal combustion engine, a clutch and a gear-changing transmission, means for interlocking the clutch and gear-changing transmission whereby gear-changing is prevented with the clutch engaged, automatic means for momentarily speeding up the engine while shifting from higher to lower gears, means for synchronizing the speed of the driving shaft with the speed of the driven shaft of the transmission, and means for releasing the interlocking means when the engine has been speeded up a predetermined amount.

20. In an automotive vehicle, having an internal combustion engine, a clutch and a gear changing transmission, automatic means including a cam plate for shifting the transmission gear, a power generating means actuated by the driven shaft of the transmission, said power generating means being operatively connected with the automatic means, a cam associated with said cam plate, said cam having rising and falling slopes, interlocking means between the automatic means and the clutch mechanism, said interlocking means having a projection adapted to follow the cam, said interlocking mechanism retarding the movement of the cam plate when the projection is following the rising slope of the cam and said interlocking means accelerating the movement of the cam plate when the projection is following the falling slope of the cam.

21. In an automotive vehicle, having an internal combustion engine, a clutch and a gear changing transmission, automatic means for momentarily speeding up the engine while shifting from higher to lower gear, said means comprising a cylinder, two pistons therein, one of said pistons being operatively connected with the engine throttle, the other of said pistons having a small hole therethrough and means for reciprocating the last-named piston in synchronization with the movement of the gear transmission.

22. In an automotive vehicle, having an internal combustion engine, a clutch and a gear changing transmission, the combination of vacuum operated means for disengaging the clutch when the engine throttle is substantially retarded, means for relieving the vacuum and reengaging the clutch when the throttle is open, automatic means for momentarily speeding up the engine while shifting from higher to lower gear, and said automatic means varying the effect of said vacuum relieving means.

23. In an automotive vehicle, having an internal combustion engine, a clutch and a gear-changing transmission, automatic means for momentarily speeding up the engine while shifting from a higher to a lower gear, said means operating while the gears are being disengaged from the higher gear ratio.

24. In an automotive vehicle, having an internal combustion engine, a clutch and a gear-changing transmission, automatic means for shifting the transmission gears and automatic means including a cam for momentarily speeding up the engine while shifting from higher to lower gear.

25. In an automotive vehicle, having an internal combustion engine, a clutch and a gear-changing transmission, automatic means for shifting the transmission gears, power-generating means actuated by the driven shaft of the transmission, means for yieldingly opposing the start of the gear-shifting operation, said means being operable to shift gears when the power-generating means has accumulated sufficient energy to overcome the opposing means, locking means for preventing the operation of said last-named means, and means independent of the power generating means for releasing the locking means.

26. In an automotive vehicle having an internal combustion engine, a clutch and a gear-changing transmission, automatic means for shifting the transmission gears, power-generating means actuated by the driven shaft of the transmission, means for yieldingly opposing the start of the gear-shifting operation and absorbing energy from the power generating means, and means for using the accumulated energy for accelerating the completion of the gear-shifting operation.

27. In an automotive vehicle having an internal combustion engine, a gear-changing transmission, a propeller shaft, and a clutch for interconnecting the engine and shaft, automatic means for disengaging the clutch whenever the engine throttle opening is reduced substantially below the point necessary to maintain the current engine speed and power, and automatic means for re-engaging the clutch upon the reopening of the throttle beyond that point, said clutch-actuating means comprising a cylinder and a piston, one end of the cylinder being alternatively connected with a vacuum or atmospheric pressure, a valve controlling the admission of atmospheric pressure to the cylinder, a device for positioning said valve, and connecting means between said device and gear-changing transmission, said connecting means operating automatically to vary the position of the valve during the changing of gears.

OSCAR WERNER.